(12) United States Patent  
Akai et al.

(10) Patent No.: US 9,195,352 B2  
(45) Date of Patent: Nov. 24, 2015

(54) TOUCH SENSOR PANEL CONTROLLER AND SEMICONDUCTOR DEVICE

(75) Inventors: Akihito Akai, Kodaira (JP); Tatsuya Ishii, Kodaira (JP); Kazuya Endo, Itami (JP); Shinobu Notomi, Itami (JP); Akihiro Kodama, Itami (JP)

(73) Assignee: SYNAPTICS DISPLAY DEVICES GK, Tokyo (JP)

( * ) Notice: Subject to any disclaimer, the term of this patent is extended or adjusted under 35 U.S.C. 154(b) by 552 days.

(21) Appl. No.: 13/467,214

(22) Filed: May 9, 2012

(65) Prior Publication Data

US 2012/0287081 A1    Nov. 15, 2012

(30) Foreign Application Priority Data

May 9, 2011    (JP) .................................. 2011-104294

(51) Int. Cl.
   - *G09G 3/36* (2006.01)
   - *G06F 3/044* (2006.01)
   - *G09G 3/20* (2006.01)
   - *G06F 3/041* (2006.01)
   - *G02F 1/1333* (2006.01)

(52) U.S. Cl.
   CPC .............. *G06F 3/044* (2013.01); *G06F 3/0416* (2013.01); *G09G 3/2092* (2013.01); *G02F 1/13338* (2013.01)

(58) Field of Classification Search
   CPC ............ G06F 3/041; G06F 3/044; G09G 3/36
   USPC .............................................. 345/87, 156–175
   See application file for complete search history.

(56) References Cited

U.S. PATENT DOCUMENTS

| 2007/0257890 | A1 | 11/2007 | Hotelling et al. | |
| 2009/0009483 | A1* | 1/2009 | Hotelling et al. | 345/173 |
| 2010/0066692 | A1* | 3/2010 | Noguchi et al. | 345/173 |
| 2010/0328257 | A1 | 12/2010 | Noguchi et al. | |
| 2012/0068961 | A1* | 3/2012 | Mizuhashi et al. | 345/174 |
| 2012/0105338 | A1* | 5/2012 | Lin et al. | 345/173 |

FOREIGN PATENT DOCUMENTS

JP    2011-008724    1/2011

* cited by examiner

*Primary Examiner* — Grant Sitta  
(74) *Attorney, Agent, or Firm* — Miles & Stockbridge PC

(57) ABSTRACT

Provided is a touch sensor panel which can increase the detection sensitivity of a touch relatively readily. The touch sensor panel controller supplies drive electrodes of a touch sensor panel with a high-voltage AC drive signal with its low level set to a negative voltage and drives them. The time of change of a drive waveform supplied to the drive electrodes of the touch sensor panel is shifted relative to the time of change of a drive waveform supplied to a display scan electrode. The touch sensor panel controller uses a charge pump in synchronization with clock signals of more than one phase to produce a high drive voltage to activate drive electrodes of the touch sensor panel, and the clock signals of more than one phase are initialized each time the drive electrode is subjected to AC pulse driving.

12 Claims, 12 Drawing Sheets

[ a: X ELECTRODE VHSP CHARGE (NOT DETECTED), b: DETECTED ]

(a: Tone voltage of the pixel electrode S on G1 is fixed.)

FIG.12
| VGLVL[1:0] | VYL |
|---|---|
| 2'b00 | 0 |
| 2'b01 | -5V |
| 2'b10 | -9V |
| 2'b11 | -15V |
FIG.13
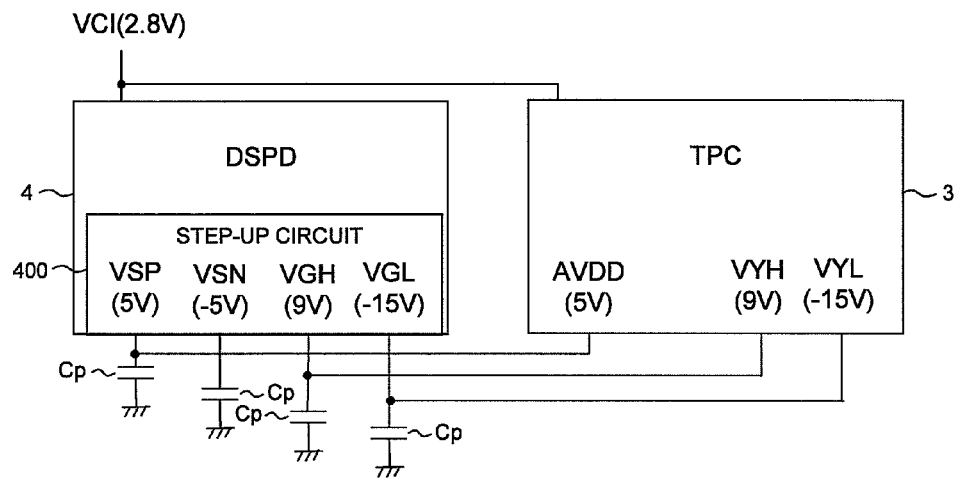
FIG.14
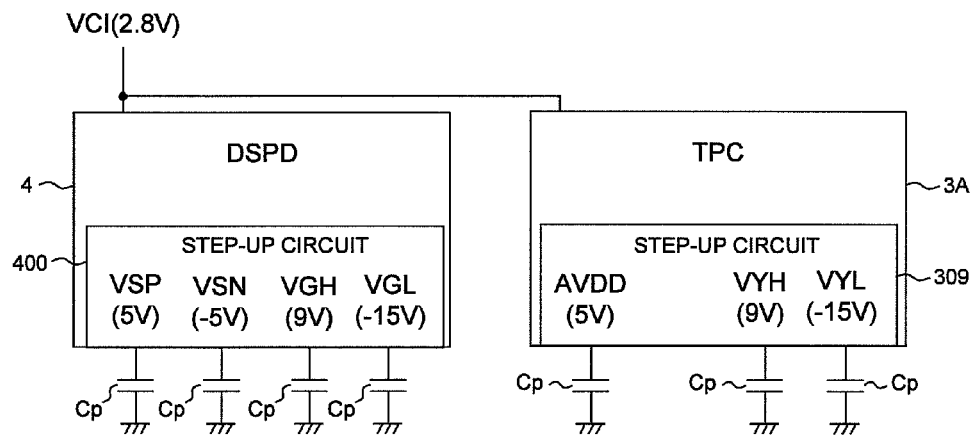

FIG.19

| Twait[5:0] | t1 |
|---|---|
| 6'h00 | 0.25us |
| 6'h01 | 0.50us |
| 6'h02 | 0.75us |
| 6'h03 | 1.00us |
| : | : |
| 6'h3F | 16us |
| Tydrv[5:0] | t2 |
| 6'h00 | 0.25us |
| 6'h01 | 0.50us |
| 6'h02 | 0.75us |
| 6'h03 | 1.00us |
| : | : |
| 6'h3F | 16us |
| Tset[5:0] | t3 |
| 6'h00 | 0.25us |
| 6'h01 | 0.50us |
| 6'h02 | 0.75us |
| 6'h03 | 1.00us |
| : | : |
| 6'h3F | 16us | ly on the method for improving the S/N ratio (i.e. signal-to-noise
TOUCH SENSOR PANEL CONTROLLER AND SEMICONDUCTOR DEVICE

CROSS-REFERENCE TO RELATED APPLICATIONS

The Present application claims priority from Japanese application JP 2011-104294 filed on May 9, 2011, the content of which is hereby incorporated by reference into this application.

BACKGROUND

The present invention relates to a touch sensor panel controller and a semiconductor device using the same, and a technique useful in application to e.g. an LC display panel unit with a touch sensor panel unit incorporated therein.

For example, a touch sensor panel supporting multiple points of touching according to a mutual capacitance method has Y electrodes used as drive electrodes and X electrodes used as detection electrodes, in which the X and Y electrodes are crossing each other at right angles with dielectric interposed therebetween, and capacitance (i.e. intersection capacitance) is formed at each intersection. In case that a finger or hand produces a capacitance near the intersection capacitance, the mutual capacitance at a node concerned is reduced by a combined capacitance produced by the finger or hand. To detect which intersection capacitance the change in the mutual capacitance comes from, the touch sensor panel controller activates the drive electrodes by a pulse to perform a charging operation by the pulse in turn, repeats the operation for detecting a change of the stored charge from the respective detection electrodes in turn, and takes a signal depending on a change of the mutual capacitance of intersection capacitances arranged in a matrix form. A controller for which a mutual capacitance method like this is adopted, and which activates a touch sensor panel to detect signals has been described by e.g. U.S. Patent Application Ser. No. 2007/0257890A1. In the above patent document, the detection circuit for detecting signals from the X electrodes includes an integration circuit with an operational amplifier incorporated therein. In the integration circuit, an electric charge, which is defined by the product of a drive voltage of the Y electrodes and a capacitance value of the intersection capacitance, is accumulated according to AC pulse driving in turn. The coordinates of points in a location which the finger or hand has approached are found based on the difference of accumulated charge between the case of approach of a finger or hand reducing the capacitance value of the intersection capacitance, and the case of approach of a finger or hand causing no change, etc.

SUMMARY

The inventor has examined a noise source of a detection circuit in a touch sensor panel controller. With a finger put in contact with a touch sensor panel, the capacitance change in an intersection capacitance is at most about one (1) pF. For judging the presence or absence of such a small change from signals of the X electrodes correctly, it is necessary to shut out the influence of noise from surroundings thereof. In a portable terminal device such as PDA (Personal Digital Assistant) and the like, a touch sensor panel is superposed on a surface of an LC display. U.S. Patent Application Ser. No. 2007/0257890A1 contains the description about the relation between a touch sensor panel and an LC display panel. However, in this patent document, no sufficient examination taking into account the relation with an LC display panel is made on the method for improving the S/N ratio (i.e. signal-to-noise ratio) of touch detection by a touch sensor panel.

It is an object of the invention to provide a touch sensor panel which can increase the detection sensitivity of a touch relatively readily.

It is another object of the invention to provide a semiconductor device, which can increase the detection sensitivity of a touch sensor panel in the relation with display driving of a display panel relatively readily.

The above and other objects of the invention and novel features thereof will be apparent from the description hereof and the accompanying drawings.

Of embodiments herein disclosed, representative ones will be briefly described below.

As the first embodiment, a touch sensor panel controller supplies drive electrodes of a touch sensor panel with an AC drive signal having a low level of a negative voltage, and drives the touch sensor panel.

As the second embodiment, the time of change of a drive waveform supplied to a drive electrode of a touch sensor panel is shifted relative to the time of change of a drive waveform supplied to a display scan electrode.

As the third embodiment, the touch sensor panel controller controls a charge pump in synchronization with more than one phase of clock signals to produce a drive voltage for driving a drive electrode of a touch sensor panel, and initializes the more than one phase of clock signals for each AC pulse driving of the drive electrode.

The effects that the representative embodiments of the invention herein disclosed bring about are briefly outlined below.

The first is that the detection sensitivity of a touch can be increased relatively readily.

The sensitivity of detection of touching a touch sensor panel can be increased relatively readily in the relation with display driving of a display panel.

BRIEF DESCRIPTION OF THE DRAWINGS

FIG. 12 is an explanatory diagram exemplifying the correspondence between a register value and a drive pulse voltage for the Y electrodes in the case of making the voltage variable by register setting;

FIG. 13 is a block diagram exemplifying a power source system running to the LC driver and to the touch sensor panel controller;

FIG. 14 is a block diagram showing an example where the LC driver and the touch sensor panel controller each have a step-up circuit;

FIG. 19 is an explanatory diagram exemplifying values set in registers for setting the parameters t1, t2 and t3, and set times corresponding to the set values;

DETAILED DESCRIPTION

1. Summary of the Embodiments

Figure 1:
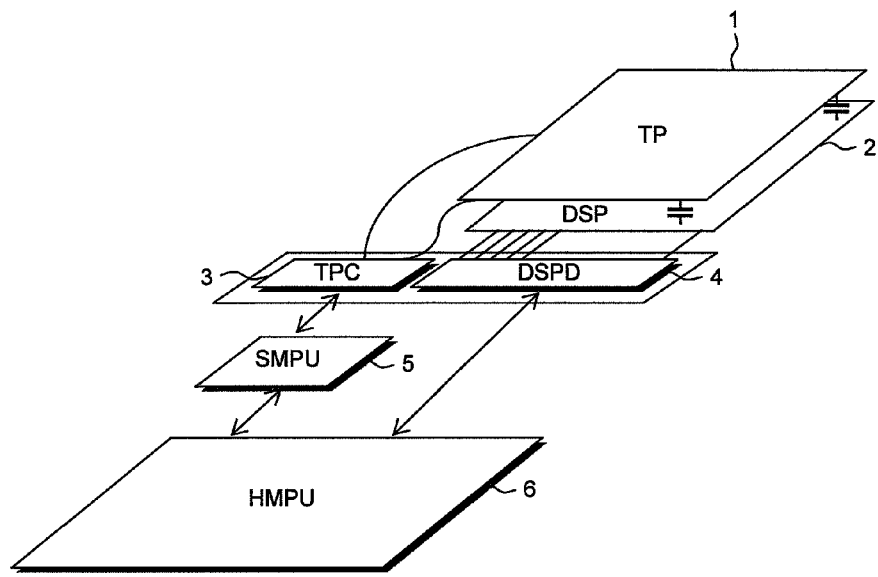
FIG. 1 is an explanatory diagram showing a general structure of a display-and-input device to which the invention is applied.

The representative embodiments of the invention herein disclosed will be outlined first. Here, the reference numerals for reference to the drawings, which are accompanied with paired round brackets, only exemplify what the concepts of members or components referred to by the numerals contain.

[1]<Low Level of AC Drive Pulse of TP Set to Negative Voltage>

A touch sensor panel controller (3) for a touch sensor panel having Y electrodes (Y1-YM), X electrodes (X1-XN), and a capacitance formed at each of intersections of the X and Y electrodes according to an embodiment of the invention has: a drive circuit (300) which drives the Y electrodes of the touch sensor panel; a detection circuit (301) which accepts input of signals from the X electrodes, and detects a capacitance value of the capacitance at each intersection; and a control part (308) which controls the drive circuit and the detection circuit. The drive circuit applies a pulse of AC drive voltage with its low level made a negative voltage to the Y electrodes.

According to the arrangement, the Y electrodes are driven by a high-voltage pulse of AC drive voltage, and thus the amount of electric charge which the capacitance at each intersection accumulates in one pulse driving is increased. Therefore, the signal components can be made larger and a higher S/N ratio can be achieved. In addition, setting the low level of the AC drive voltage to a negative voltage allows e.g. the diversion of an operation power source of a circuit which uses a negative voltage as a drive voltage like a display panel, and thus a high voltage can be obtained readily.

[2]<Negative Voltage Level Selectable From Outside>

In the touch sensor panel controller as described in the above paragraph [1], the control circuit decides the negative voltage level based on select data (VGLVL data) supplied from outside.

According to the arrangement, assuming that the touch sensor panel controller is placed in the vicinity of an additional circuit, e.g. a display driver, it becomes possible to select a negative voltage of the optimum level, while taking into account the point that the AC drive voltage makes noise supplied to the additional circuit, and the resistance to the noise provided from the additional circuit.

[3]<Touch Sensor Panel AC Drive Pulse Voltage Arranged Taking into Account LCD Drive Voltage>

A semiconductor device according to another embodiment of the invention has: a touch sensor panel controller (3) for a touch sensor panel (1) having Y electrodes (Y1-YM), X electrodes (X1-XN), and a capacitance (Cxy) formed at each of intersections of the X and Y electrodes; and a display driver (4). The touch sensor panel controller drives the Y electrodes of the touch sensor panel (1), accepts input of signals from the X electrodes, and detects capacitance values of the capacitances at the intersections. The display driver supplies a display drive voltage to an active matrix type display panel (2) having display cells at points where scan electrodes (G1-G640) and signal electrodes (D1-D1440) intersect each other. The touch sensor panel controller has a drive circuit (300) operable to apply a pulse of AC drive voltage with its low level made a negative voltage to the Y electrodes.

According to the arrangement, the Y electrodes are driven by a high-voltage pulse of AC drive voltage, and thus the amount of electric charge which the capacitance at each intersection accumulates in one pulse driving is increased. Therefore, the signal components can be made larger and a high S/N ratio can be achieved. In addition, setting the low level of the AC drive voltage to a negative voltage allows the diversion of an operation power source of a circuit which uses a negative voltage as a drive voltage like the display driver, and thus a high voltage for AC driving can be obtained readily.

[4]<Application of a Voltage of the Step-Up Circuit of the Display Driver to AC Drive Voltage>

In the semiconductor device as described in the above paragraph [3], the display driver has a step-up circuit (400) operable to produce voltages used for driving the scan and signal electrodes. The drive circuit uses a voltage (VYL) produced by the step-up circuit for both or one of the high and low level voltages of the AC drive voltage.

According to the arrangement, the AC drive voltage can be obtained readily without providing a dedicated step-up circuit in the touch sensor panel controller nor providing a drive voltage supply circuit outside, thanks to the diversion of the step-up voltage of the display driver.

[5]<Negative Voltage Level Selectable From Outside>

The touch sensor panel controller as described in the paragraph [3] further includes a control part operable to decide the negative voltage level based on select data(VGLVL data) provided from outside.

According to the arrangement, an optimum level of negative voltage can be selected taking into account the level of noise that the AC drive voltage provides to the display driver, and resistance against noise provided from the display driver.

[6]<Single Chip or Multichip>

The semiconductor device as described in the paragraph [3] has a structure composed of one of a single chip having the touch sensor panel controller (3) and the display driver (4) formed on a common semiconductor substrate, and a multichip having the touch sensor panel controller and the display driver formed on separate semiconductor substrates.

The scopes of options of the touch sensor panel controller and the display driver on the touch sensor panel and display panel to be controlled are broadened by forming a semiconductor device having such a multichip structure, whereas forming such semiconductor device having a single chip structure can contribute to the downsizing of the device.

[7]<Prevention of Interference Between Touch Sensor Panel Y Electrode Drive Waveform and Display Panel scan Electrode Drive Waveform>

A semiconductor device according to another embodiment of the invention has: a touch sensor panel controller (3) for a touch sensor panel (1) having Y electrodes (Y1-YM), X electrodes (X1-XN), and a capacitance (Cxy) formed at each of intersections of the X and Y electrodes; and a display driver (4). The touch sensor panel controller drives the Y electrodes of the touch sensor panel (1), accepts input of signals from the X electrodes, and detects capacitance values of the capacitances at the intersections. The display driver supplies a display drive voltage to an active matrix type display panel (2) having display cells at points where scan electrodes (G1-G640) and signal electrodes (D1-D1440) intersect each other. The touch sensor panel controller has a first drive circuit (300) operable to apply a first pulse waveform to the Y electrodes. The display driver has a second drive circuit (AMPvf) operable to apply a second pulse waveform to the scan electrodes of the LC display panel. The first and second drive circuits are arranged so that a high level period of the first pulse waveform is within a high level period of the second pulse waveform, and the first pulse waveform is smaller than the second pulse waveform in the width of the high level thereof (see FIG. 8).

With this arrangement, it is found that focusing on the timing of the change in voltage of each scan electrode of the display panel, in control by the touch sensor panel controller, each Y electrode is put in a non-pulse drive period, during which the X electrode is in a non-detection period (charge period), in line with the timing. Therefore, the noise generated by the change in voltage of the scan electrode has no influence on the detecting operation on the X electrode, which is executed in a pulse drive period of the Y electrode. Further, focusing on the timing of the change in voltage of each Y electrode of the touch sensor panel, it is found that in control by the display driver, the timing of down falling of the drive pulse (first pulse waveform) for the Y electrode is not coincident with the timing of down falling of the drive pulse (second pulse waveform) for the scan electrode, at which a signal voltage supplied to a display cell is fixed. Therefore, the noise generated by the change in voltage of the Y electrode has no influence on the signal voltage fixed on the display cell. In short, the impairment of the ability of detecting a touch in the case of using the touch sensor panel controller, and the degradation of the performance of display by the display driver can be avoided.

[8]<Control of Touch Sensor Panel Y Electrode Drive Waveform Based on the Drive Timing of the Display panel>

In the semiconductor device as described in the paragraph [7], the second drive circuit produces the second pulse waveform based on a drive timing of the display panel. The first drive circuit produces the first pulse waveform based on the drive timing of the display panel, provided that the high level period of the first pulse waveform is set within the high level period of the second pulse waveform, and the first pulse waveform is set to be smaller than the second pulse waveform in the width of the high level thereof (see FIG. 8).

According to the arrangement, reference is made to the second pulse waveform, and therefore the first pulse waveform can be readily produced based on it.

[9]<Setting of the Timing of Change Concerning a Drive Pulse Waveform of the Scan Electrode>

In the semiconductor device as described in the paragraph [8], the timing of change of the first pulse waveform is set by setting, on the first drive circuit, a wait time (t1) which is an elapse of time after the rising of the second pulse waveform, and a set time (t3) before the falling of the second pulse waveform.

According to the arrangement, the first pulse waveform with respect to the second pulse waveform can be readily determined by using parameters.

[10]<Initialization of the Charge Clock of the Charge Pump for Each Y Electrode>

A touch sensor panel controller (3A) according to another embodiment of the invention is for a touch sensor panel (1) having Y electrodes (Y1-YM), X electrodes (X1-XN), and a capacitance (Cxy) formed by the X and Y electrodes at each of intersections thereof. The touch sensor panel controller has: a drive circuit (300) operable to drive the Y electrodes of the touch sensor panel (1); a detection circuit (301) operable to accept input of a signal from the X electrode and to detect a capacitance value of the capacitance at the intersection; and a step-up circuit (309) operable to produce a power source voltage for operating the drive circuit and the detection circuit. The drive circuit applies more than one pulse waveform to each Y electrode to activate the Y electrode. The step-up circuit performs a charge pump operation in synchronization with pulse changes of charge clock signals (CCK1-CCK4) of more than one phase. The charge clock signals of more than one phase are initialized in units of cycles of driving (YN-SCAN_ST) by more than one pulse waveform for each Y electrode.

According to the arrangement, the number of clock changes of the charge clock signals of more than one phase, which determines the number of charge pump operations of the step-up circuit, is constant for each fixed period of pulse driving on the Y electrodes. Therefore, the amount of superimposed noise resulting from the voltage step-up operation of the step-up circuit is fixed in each operation and as such, it is possible to prevent noise variations from deteriorating the accuracy of touch detection. In the case of using a step-up circuit of just a feedback control mode, the number of operations of the charge pump occurring in each fixed period of pulse driving on Y electrodes is unstable, noise variations affect the accuracy of touch detection.

[11]<Initialization of a Counter Operable to Produce the Charge Clock>

In the touch sensor panel controller as described in the paragraph [10], the step-up circuit has a counter (410) which counts clock signals and produces the charge clock signals of more than one phase based on outputs of required digits, and the counter has a count value initialized in units (YN-SCAN_ST) of cycles of driving by more than one pulse waveform for each Y electrode.

According to the arrangement, use of the counter as described above makes possible to readily materialize the generation of required charge clock signals and the initialization.

[12]<Initialization of the Charge Clock of the Charge Pump for Each Y Electrode>

A semiconductor device according to another embodiment of the invention has a touch sensor panel controller (3) for a touch sensor panel (1) having Y electrodes (Y1-YM), X electrodes (X1-XN), and a capacitance (Cxy) formed by the X and Y electrodes at each of intersections thereof, a display driver (4) and a step-up circuit (700). The touch sensor panel controller has a drive circuit (300) operable to drive the Y electrodes of the touch sensor panel (1), and a detection circuit (301) operable to accept input of a signal from the X electrode and to detect a capacitance value of the capacitance at the intersection. The display driver supplies a display drive voltage to an active matrix type display panel (2) having display cells at points where scan electrodes (G1-G640) and signal electrodes (D1-D1440) intersect each other. The drive circuit applies more than one pulse waveform to each Y electrode to activate the Y electrode. The step-up circuit produces power source voltages to operate the drive circuit, the detection circuit and the display driver, and performs a charge pump operation in synchronization with pulse changes of charge clock signals (CCK1-CCK4) of more than one phase. The charge clock signals of more than one phase are initialized in units (YNSCAN_ST) of cycles of driving by more than one pulse for each Y electrode.

The above arrangement brings about the same effects and advantages as those of the touch sensor panel controller as described in the paragraph [10]. However, the step-up circuit described here is not limited to exclusively use for a touch sensor panel controller, it may be used for supply of an operation power source to a display driver, too.

[13]<Initialization of a Counter Operable to Generate a Charge Clock>

In the semiconductor device as described in the paragraph [12], the step-up circuit has a counter (410) which counts clock signals and produces the charge clock signals of more than one phase based on outputs of required digits, and the counter has a count value initialized in units of cycles of driving by more than one pulse waveform for each Y electrode.

The above arrangement brings about the same effects and advantages as those of the touch sensor panel controller as described in the paragraph [11].

2. Further Detailed Description of the Embodiments

The embodiments will be described further in detail.

(First Embodiment)

FIG. 1 is a diagram showing the general structure of a display-and-input device to which the invention is applied. The display-and-input device shown in the drawing constitutes part of a portable terminal device, e.g. a PDA or a portable telephone, and include a touch sensor panel (TP) 1, an LC display panel (DSP)2 used as a display panel, a touch sensor panel controller (TPC) 3, and an LC driver (DSPD)4 used as a display driver.

The touch sensor panel controller 3 drives the touch sensor panel 1 under the control of a subsystem microprocessor (SMPU) 5, and sequentially takes and accumulates signals from an array of capacitances at intersections of the X and Y electrodes, and returns the accumulated signals to the subsystem microprocessor 5. The subsystem microprocessor 5 means that it is a microprocessor to constitute a subsystem associated with a host processor 6.

The touch sensor panel 1 is formed by a transmissive (specifically, optically transmissive) electrode and a dielectric film, and it is superposed on the display plane of an LC display 2 taking a bitmap display form. The host processor (HMPU) 6 creates display data, and the LC display driver 4 performs display control for showing display data, which have been received by itself from the host processor 6, on the LC display 2.

The subsystem microprocessor 5 conducts a digital filter calculation on signals received by itself from the touch sensor panel controller 3, thereby removing noise from the signals. Based on the resultant signals with noise removed therefrom, the subsystem microprocessor 5 computes coordinates with a touch event taking place on the touch sensor panel 3 and provides the resultant coordinate data to the host processor 6. For instance, the host processor 6 analyzes inputs through the touch sensor panel 1 from the relation between a display screen image supplied to the LC display driver 4 and displayed by the LC display 2, and coordinate data provided by the subsystem microprocessor 5.

Figure 2:
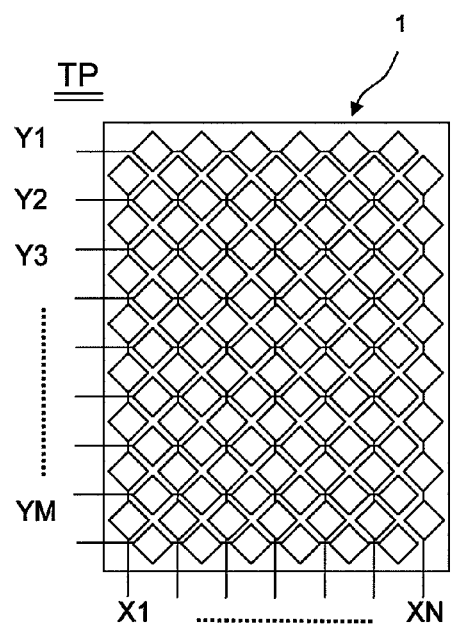
FIG. 2 is an explanatory diagram exemplifying the configuration of electrodes of a touch sensor panel.

FIG. 2 shows an example of the configuration of electrodes of the touch sensor panel. The touch sensor panel has a number of Y electrodes Y1-YM formed widthwise and a number of X electrodes X1-XN formed lengthwise, and X and Y electrodes are electrically insulated from each other. Each electrode has portions shaped in a square form at intervals in its extending direction, which make capacitance electrodes. The capacitance electrodes in connection with the X electrodes and the capacitance electrodes in connection with the Y electrodes form capacitances (i.e. intersection capacitances) at intersections. The Y electrodes Y1-YM are supplied with and activated by a pulse in the line order thereof.

Figure 3:
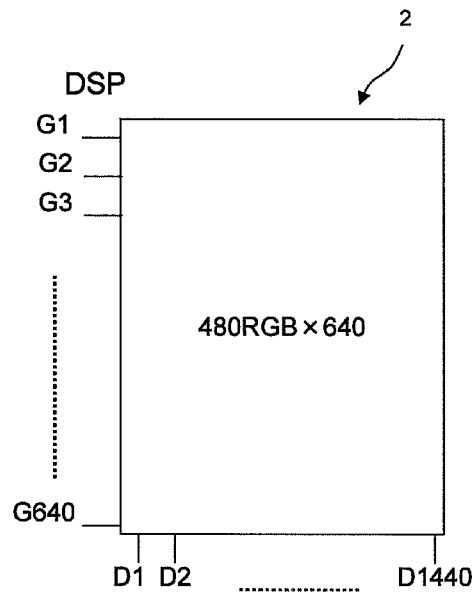
FIG. 3 is an explanatory diagram exemplifying the electrode configuration of a display panel.

FIG. 3 shows an example of the electrode configuration of the display panel 2. The display size of the display panel 2 shown in the drawing is on the scale of a size supporting e.g. 480RGB×640. The display panel 2 has gate electrodes G1-G640 used as scan electrodes and formed widthwise and drain electrodes D1-D1440 used as signal electrodes and formed lengthwise. In intersection portions of the electrodes, a number of display cells each having a select terminal connected to a corresponding scan electrode and an input terminal connected to a corresponding signal electrode are disposed. The gate electrodes G1-G640 are supplied with and activated by a pulse in the order of the electrodes arrayed.

Figure 4:
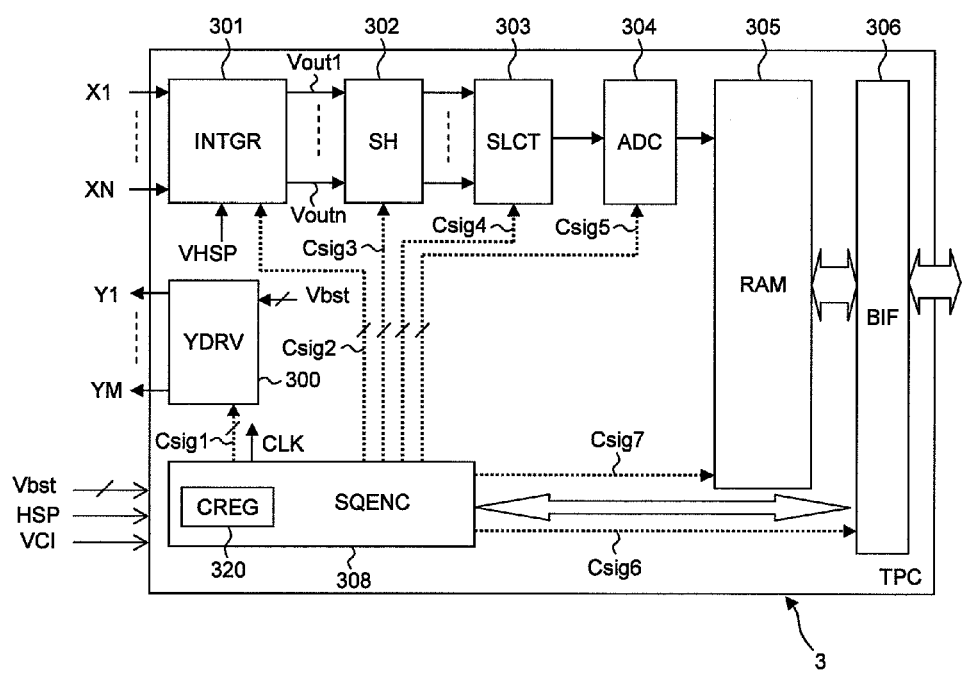
FIG. 4 is a block diagram exemplifying the general structure of a touch sensor panel controller.

FIG. 4 shows an example of the general structure of the touch sensor panel controller 3. The touch sensor panel controller 1 has: a drive circuit (YDRV)300; an integration circuit (INTGR) 301 used as a detection circuit; a sample and hold circuit (SH) 302; a selector (SLCT) 303; an AD conversion circuit (ADC) 304; a RAM 305; a bus interface circuit (BIF) 306; and a sequential control circuit (SQENC) 308.

The drive circuit 300 activates the Y electrodes Y1-YM by a pulse of AC drive voltage in the order of the electrodes arrayed. That is, the drive circuit 300 scan-activates the capacitances formed at intersections of the X and Y electrodes. The integration circuit 301 accepts, as inputs, detection signals from the scan-activated intersection capacitances in turn, and accumulates the charge of the signals. The selector 303 selects charge signals resulting from the integration in the integration circuit by the X electrodes (X1-XN), and the selected charge signals are converted into detection data by the AD conversion circuit 304. Then RAM 305 accumulates detection data resulting from the conversion. The detection data accumulated by RAM 305 are supplied to the microprocessor 5 of the subsystem through the bus interface circuit 306, and used in the digital filter calculation and the coordinate calculation.

The sequential control circuit 308 controls the drive circuit 300, the integration circuit 301, the sample and hold circuit 302, the selector 303, the AD conversion circuit 304 and the bus interface circuit 306 in operations using control signals Csig1-Csig6. Also, the sequential control circuit 308 has access control of RAM 305 by a control signal Csig7. Although no special restriction is intended, the drive voltage Vbst output to the Y electrodes by the drive circuit 300, an initialization voltage VHSP of X electrodes input to the integration circuit 301, and other power source voltage VIC are supplied from outside the touch sensor panel controller 3.

Figure 5:
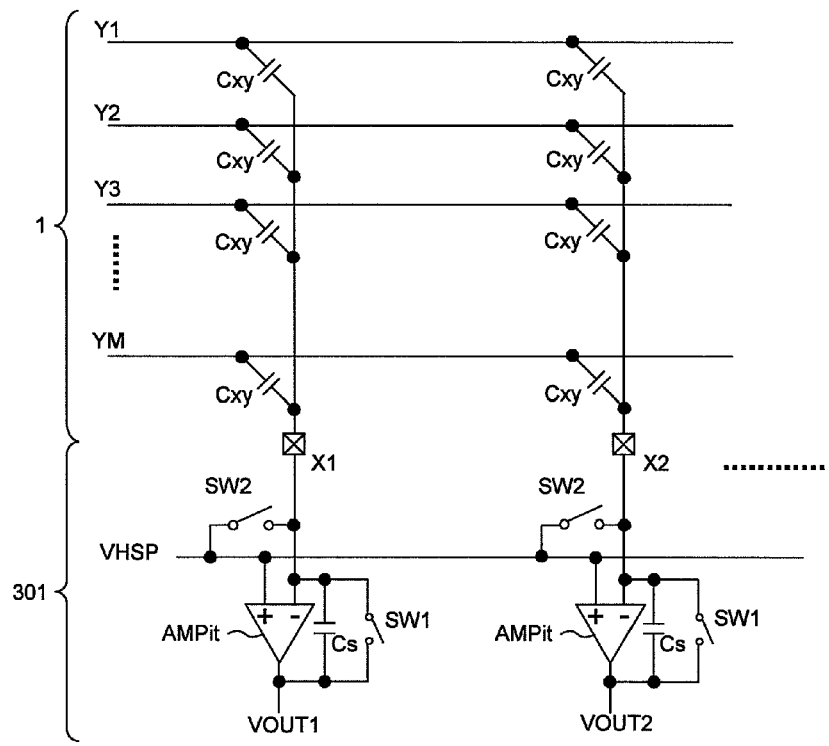
FIG. 5 is a circuit diagram exemplifying the equivalent circuit of the touch sensor panel and the integration circuit used as the detection circuit.

FIG. 5 shows an example of the equivalent circuit of the touch sensor panel 1 and an example of the integration circuit 301 used as the detection circuit. In the touch sensor panel, the Y electrodes Y1-YM and the X electrodes X1-XN are arranged in a matrix form, and intersection capacitances Cxy are formed at the intersections of the electrodes.

The integration circuit 301 includes a power source VHSP for charging via the X electrodes X1-XN, a switch. SW2 for controlling the charging of the power source VHSP via the X electrodes X1-XN, an operational amplifier AMPit, an integration capacitor Cs, and a switch SW1 for resetting the integration capacitor Cs. It is noted that the switch SW1 is one for resetting the charge put on the capacitor Cs, which is to be used in detection, and the switch SW2 is one for charging of the power source VHSP via the X electrodes X1-XN.

Figure 6:
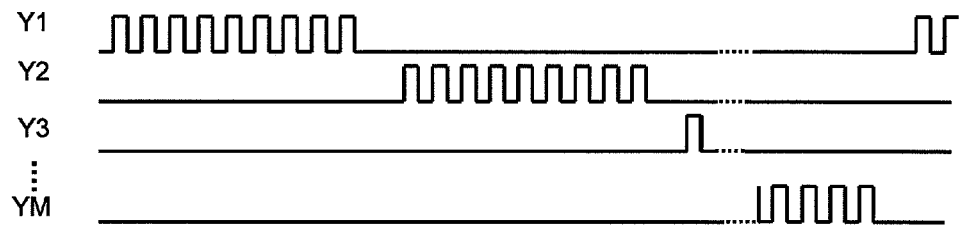
FIG. 6 is a waveform diagram exemplifying an input waveform to the Y electrodes Y1-YM.

FIG. 6 exemplifies an input waveform to the Y electrodes Y1-YM. As shown in the drawing, a pulse of AC drive voltage is input to the Y electrodes Y1-YM in the order of the electrodes arrayed. In the example shown here, the pulse of AC drive voltage is changed nine times on each Y electrode for the sake of convenience.

Figure 7:
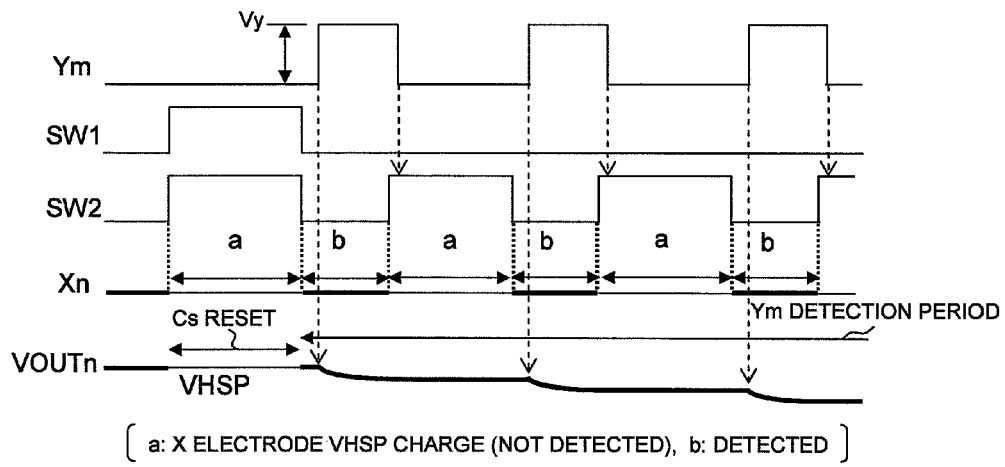
FIG. 7 is a timing chart exemplifying an input pulse voltage to the Y electrodes Y1-YM, and the timing of an operation for detection by the integration circuit.

FIG. 7 exemplifies the input pulse voltage to the Y electrodes Y1-YM, and the timing of the detection operation by the integration circuit 301. First, the switch SW2 is put in ON state to force the X electrode Xn (n=1–N) to transition to Non-detection state "a" for charging of the power source VHSP, and the switch SWS1 is put in ON state to reset the capacitor Cs. Subsequently, the switches SW1 and SW2 are put in OFF states to cause the X electrode Xn to transition to its detection-waiting state "b". In the detection-waiting state "b", the X electrode Xn is kept disconnected with the power source VHSP, and the voltage level is held in the integration circuit 301 arranged to have a virtual ground. After the transition to the detection-waiting state "b", a rising pulse having an amplitude Vy is input to the Y electrode Y1 (the other Y electrodes Y2-YM are fixed at a low level.) As a result, the charge (=Vy×Cxy) is moved to the X electrode Xn through the intersection capacitance Cxy on the Y electrode Y1, and is input to the detection circuit 301, thereby changing the output VOUTn of the operational amplifier AMPit. Just touching with a finger decreases the intersection capacitance Cxy concerned by a capacitance value Cf. Therefore, in the case of the X electrode X2 touched, for instance, a charge input to the operational amplifier AMPit associated with the X electrode X2 is Vy×(Cxy−Cf), and an output VOUT2 of the operational amplifier AMPit is at a high potential. The output VOUTn (n=1–N) is converted to detection data of digital values by the AD conversion circuit 304, and used in the coordinate calculation, and the like.

Figure 8:
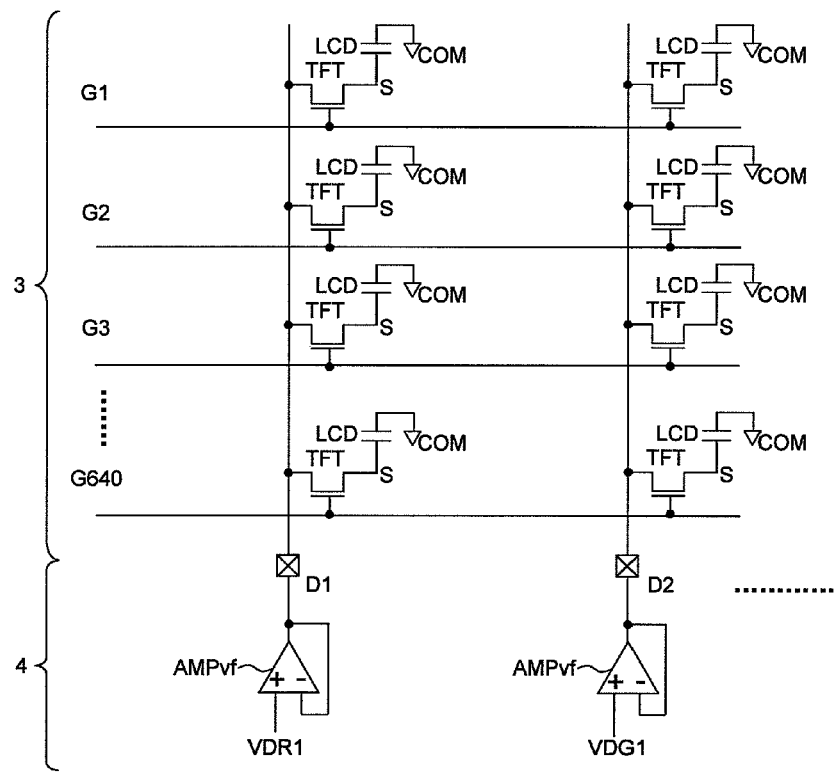
FIG. 8 is a circuit diagram exemplifying the equivalent circuit of an LC display panel, and a drive circuit of the LC driver.

FIG. 8 shows an example of the equivalent circuit of the LC display panel 2 and a drive circuit of the LC driver 4. In the LC display panel 2, gate electrodes G1-G640 and drain electrodes D1-D1440 are arranged in a matrix form, and TFT (Thin Film Transistor) switches are formed at intersection portions of the electrodes respectively. An LC pixel electrode S of an LC capacitance LCD which makes a sub-pixel is connected to a source side of each TFT switch, and an opposite side electrode of the LC capacitance LCD is included in a common electrode (COM). To the drain electrodes D1-D1440, an output of an operational amplifier AMPvf, which constitutes a voltage follower, is coupled. For instance, the operational amplifier AMPvf of the drain electrode D1 is supplied with a tone voltage VDR1 for red color, and the operational amplifier AMPvf of the drain electrode D2 is supplied with a tone voltage VDG1 for green color.

Figure 9:
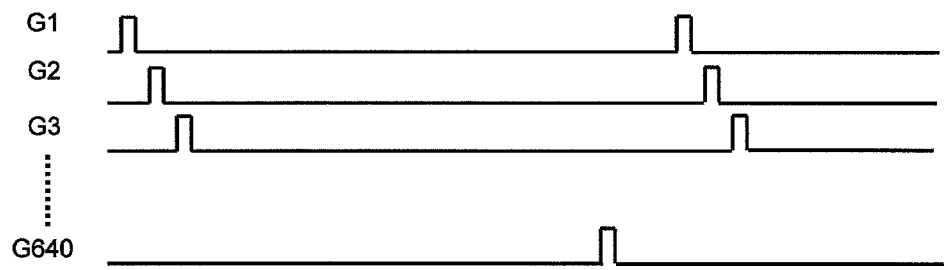
FIG. 9 is a waveform diagram exemplifying an input waveform to the gate electrodes G1-G640.

FIG. 9 shows an example of an input waveform to the gate electrodes G1-G640. To the gate electrodes G1-G640, a gate pulse is input in the order of the electrodes arrayed.

Figure 10:
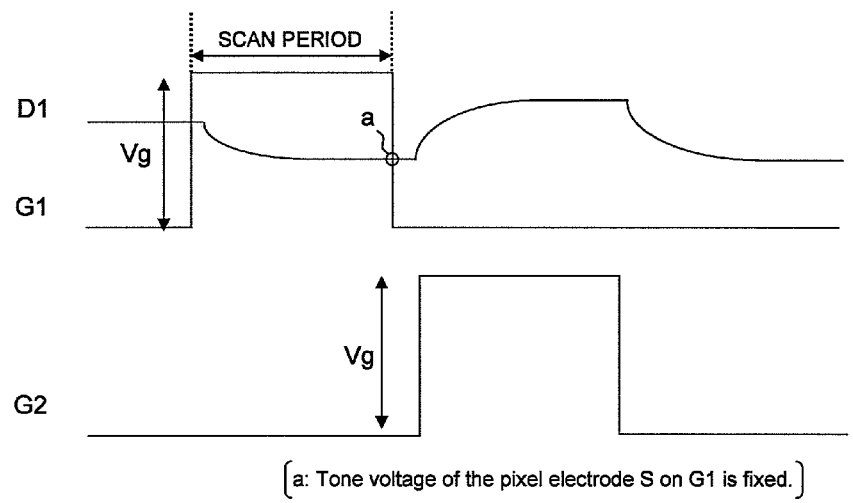
FIG. 10 is a timing chart exemplifying a gate pulse applied to the gate electrode, and the timing waveform of a tone voltage applied to the drain electrode.

FIG. 10 shows an example of a gate pulse applied to the gate electrode, and an example of the timing waveform of a tone voltage applied to the drain electrode. For instance, a gate pulse having an amplitude Vg is input to the gate electrode G1, and a TFT switch on the gate electrode G1 is put in ON state. After that, a tone voltage VDR1 is applied to the selected LC pixel electrode S through the TFT switch from the drain electrode Dl. The input voltage to the LC pixel electrode S is fixed in line with the timing of the gate pulse falling. A reference voltage is put on the common electrode COM. Therefore, even after the TFT switch is turned off, the LC capacitance LCD holds the reference voltage COM and the tone voltage VDR1 for a period of one frame, which determines the display brightness.

Figure 11:
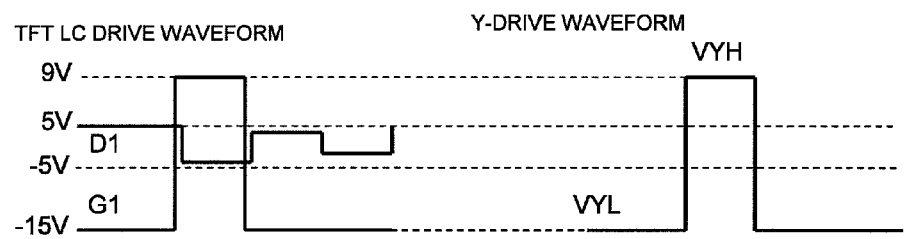
FIG. 11 is a waveform diagram exemplifying a drive waveform for gate and drain electrodes of the LC display and a drive waveform for Y electrodes of the touch sensor panel.

FIG. 11 exemplifies a drive waveform to the gate and drain electrodes of the LC display 2, and a drive waveform to the Y electrodes of the touch sensor panel 1. It has been known for the touch sensor panel 1 that supplying the Y electrode with a drive voltage having a larger pulse amplitude enables the enhancement of signal components, and thus a higher S/N ratio (signal-to-noise ratio) can be achieved. Hence, attention is directed to the point that a drive waveform to the gate electrode of the an LC driver 4 has a high level VGH of 9 volts and a low level VGL of −15 volts. Consequently, in this embodiment, a power source voltage Vbst produced in the LC driver 4 is used as a reference to generate a drive pulse voltage of the touch sensor panel 1. The power source voltage Vbst is e.g. −15, −5, 5 and 9 volts. The drive pulse voltage of the touch sensor panel 1 has a low level VYL of −15 volts and a high level VYH of 9 volts, for instance. Therefore, it becomes possible to arrange the touch sensor panel 1, the power source circuit or step-up circuit of the LC driver 4 to be commonly usable. Further, it becomes possible to cut the number of external parts, such as a stabilization capacitance or a voltage step-up capacitance for each power source voltage.

FIG. 12 exemplifies the correspondence between a register value and a drive pulse voltage for the Y electrodes in the case of making the voltage variable by register setting. Also, the drawing shows examples of the register value for setting the low level VYL of a drive pulse of AC drive voltage for driving the Y electrodes, and examples of the corresponding voltage level. With the high level VYH of the drive pulse fixed to e.g. 9 volts, the low level VYL of the drive pulse can be programmably set by the two-bit register VGLVL. The register VGLVL is a part of the control registers (CREG) 320 provided in the sequential control circuit 308 exemplified by FIG. 4. The setting contents of the register VGLVL concerned are provided to the drive circuit 300 as part of the control signal Csig1.

Within the above-described voltage range, the touch sensor panel controller 3 can be formed by an existing transistor process which is adopted for the LC driver 4. Therefore, the increase in cost involved with additional process development, etc. is not required. As a matter of course, the power source voltage produced in the power source circuit or the step-up circuit of the LC driver 4 can be used for all or part of the power source voltage of a drive pulse driving the Y electrodes. In the example shown in FIG. 12, the voltage of −9 volts is produced by the voltages of −5 and −15 volts in the touch sensor panel controller 3.

Further, as exemplified by FIGS. 11 and 12, a high-voltage drive pulse for the Y electrodes, which has a potential difference of 24 volts at maximum, can be expected to allow the achievement of a high S/N ratio with the touch sensor panel 1 as already described, whereas it would be a noise source to the LC display 2 used in combination with the touch sensor panel 1. Hence, this embodiment allows the adjustment of a pulse amplitude Vy (=VYH−VYL) so as to achieve both a high S/N ratio and the avoidance of the deterioration in display according to the setting on the register VGLVL as already described, taking into account that the extent to which the high-voltage drive pulse affects the display of the LC display 2 as a noise source depends on the mounting method of the touch sensor panel 1 and the LC display 2.

FIG. 13 exemplifies a power source system running to the LC driver 4 and the touch sensor panel controller 3. In the drawing, a drive voltage is commonly used for the LC driver 4 and touch sensor panel controller 3, which are formed in separate semiconductor chips respectively, as described. The LC driver 4 includes a step-up circuit 400, which generates a high voltage, as already described. The voltage AVDD (5V) is used as e.g. a power source for producing the power source VHSP already described with reference to FIG. 5. As to the number of external parts typified by stabilizing capacitances Cp, which the power source system as shown in FIG. 13 needs, a smaller number of external parts suffices in comparison to the case where the LC driver 4 and the touch sensor panel controller 3 have step-up circuits 400 and 309 respectively as shown in FIG. 14.

Figure 16:
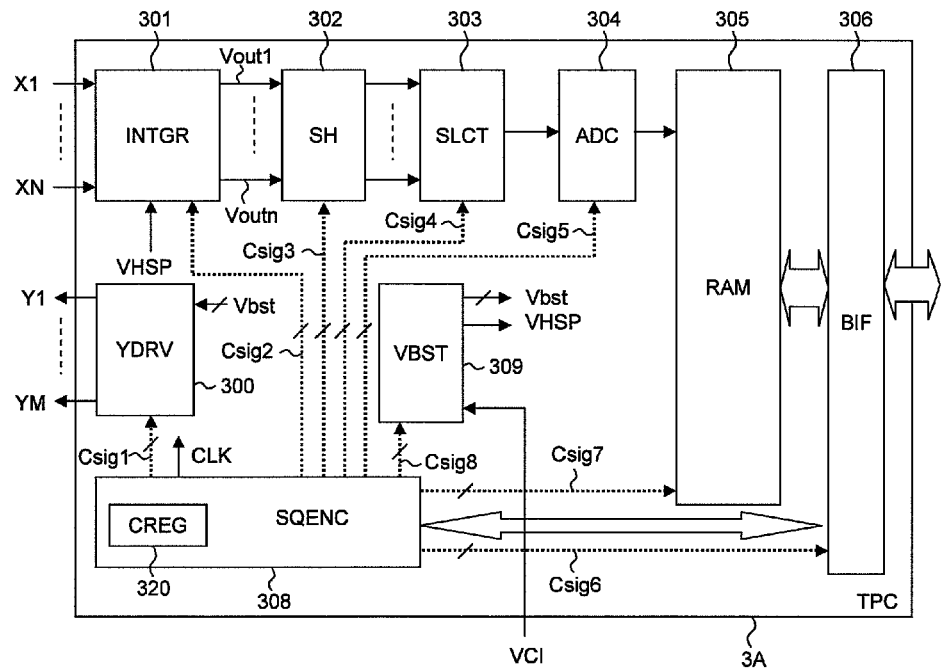
FIG. 16 is a block diagram exemplifying a touch sensor panel controller with a step-up circuit.

FIG. 16 shows an example of a touch sensor panel controller 3A with a step-up circuit 309. The touch sensor panel controller 3A is different from that shown in FIG. 4 in that the step-up circuit (VBST) 309 is provided. However, the touch sensor panel controller is identical with that shown in FIG. 4 in other configuration. Therefore, like parts or components are identified by the same reference numeral or character, and the detailed description thereof is skipped here. The step-up circuit 309 produces step-up voltages Vbst and VHSP from an external voltage VCI according to control signals Csig8 supplied from the sequential control circuit 308. The touch sensor panel controller 3A has a dedicated step-up circuit 309 and therefore, the scope of selection of the drive pulse voltage for the Y electrodes is broadened without being restricted in step-up voltage by the step-up circuit 400 of the LC driver 4.

Figure 15:
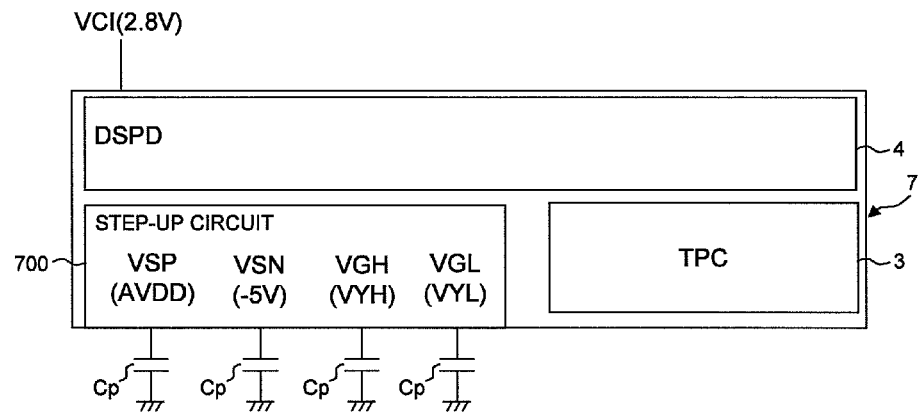
FIG. 15 is a block diagram exemplifying a driver device with the display driver and the touch sensor panel controller formed in a single chip.

FIG. 15 exemplifies a driver device 7 with the display driver 4 and the touch sensor panel controller 3 formed in a single chip. The driver device 7 has a step-up circuit 700 shared by the display driver 4 and the touch sensor panel controller 3. The step-up circuit 700 generates voltages of 5, −5, 9 and 15 volts and supplies them to the display driver 4 and the touch sensor panel controller 3. Taking into account the resister setting concerning a pulse voltage for the Y electrodes already described with reference to FIG. 12, the step-up circuit 700 may have the function of outputting the voltage of −9 volts further.

Figure 17:
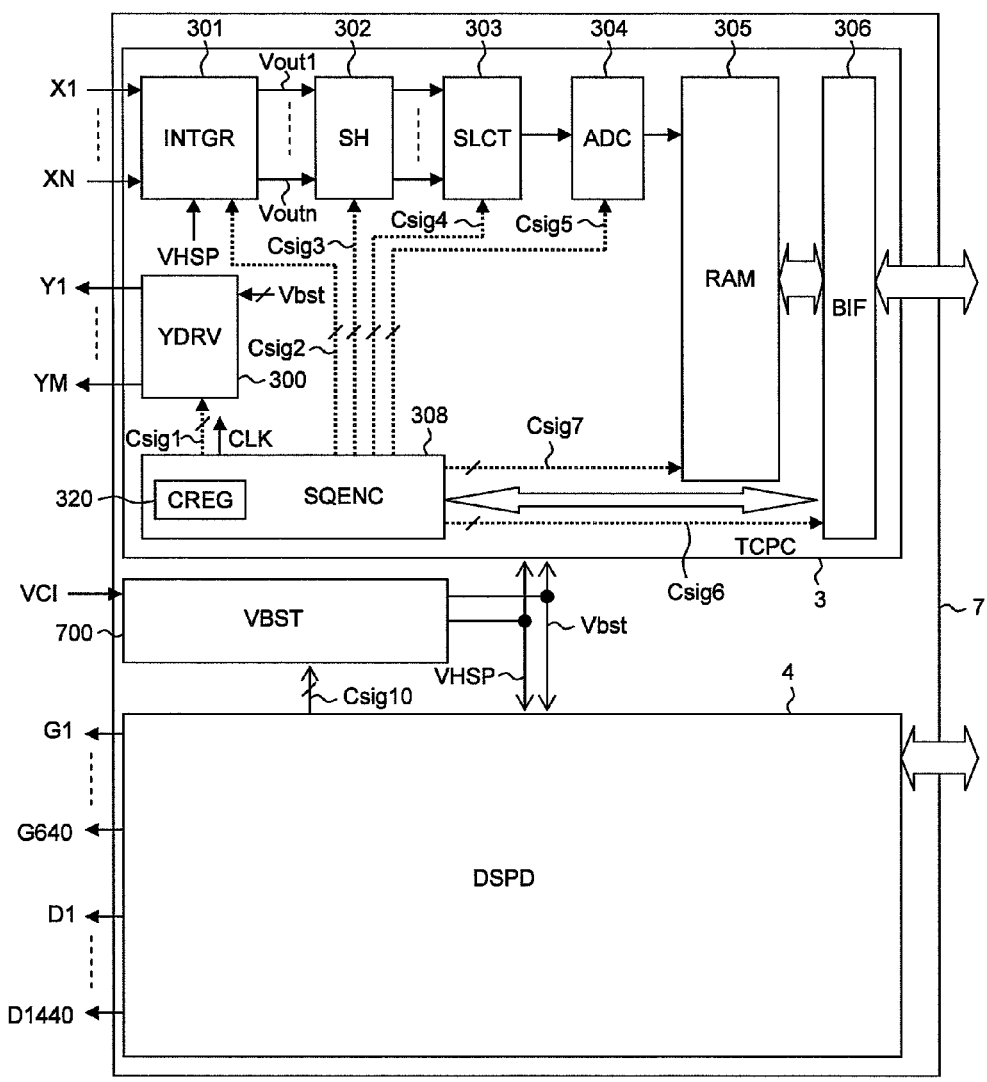
FIG. 17 is a block diagram showing a concrete example of the driver device of FIG. 15.

FIG. 17 shows a concrete example of the driver device 7 of FIG. 15. The driver device shown in FIG. 17 is different from the touch sensor panel controller shown in FIG. 4 in that the step-up circuit (VEST) 700 and the LC driver 4 are provided therein. However, the driver device of FIG. 17 is identical with the touch sensor panel controller of FIG. 4 in other configuration. Therefore, like parts or components are identified by the same reference numeral or character, and the detailed description thereof is skipped here. The step-up circuit 700 produces step-up voltages Vbst and VHSP from the external voltage VCI according to control signals Csig10 supplied from the LC driver 4. The device driver 7 is a type of device such that if the device chiefly functions as an LC driver, the term "LC driver" is used as the appellation thereof, whereas if the device chiefly functions as a touch sensor panel controller, it is referred to as "touch sensor panel controller".

Forming the display driver 4 and the touch sensor panel controller in one chip can contribute to the downsizing of a system to which this embodiment is applied.

(Second Embodiment)

Now, the relation between a drive waveform of the LC display and a drive pulse waveform of the touch sensor panel according to the second embodiment of the invention will be described. In the first embodiment, the improvement of the detection sensitivity or a higher S/N ratio is achieved by making higher the voltage of the drive pulse supplied to the Y electrodes Y1-YM of the touch sensor panel 1. It is presumed that the drive pulse supplied to the Y electrodes Y1-YM, which is arranged as a high-voltage pulse, becomes noise for the LC display panel 2 and the LC driver 4. The second embodiment provides a control timing suitable for achieving a high S/N ratio of the touch sensor panel by means of making higher the drive pulse supplied to the Y electrodes, and avoiding the display deterioration of the LC display panel.

Figure 18:
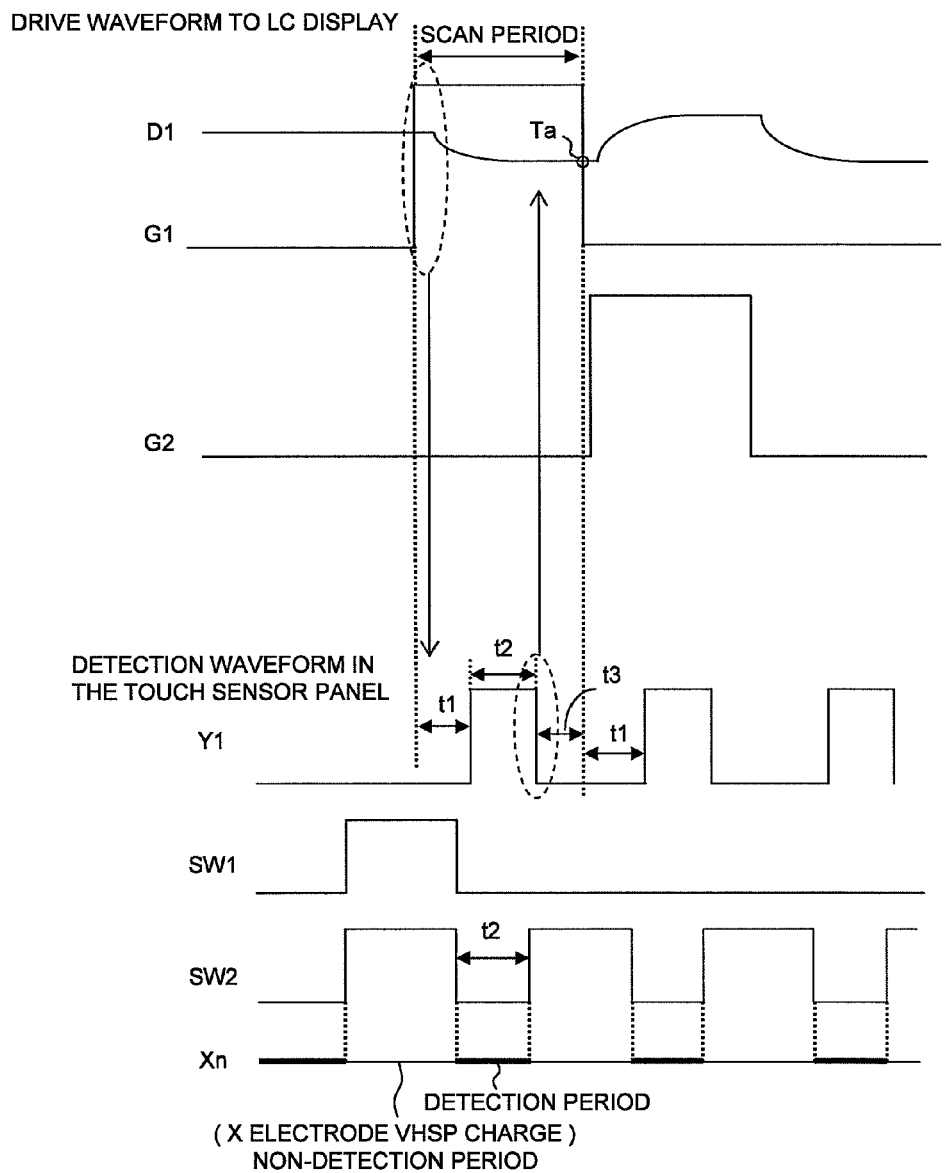
FIG. 18 is a timing chart exemplifying the relation between a drive waveform for the LC display panel, and a drive pulse waveform for the Y electrodes of the touch sensor panel.

FIG. 18 exemplifies the relation between the drive waveform of the LC display panel and the Y electrode drive pulse waveform of the touch sensor panel.

The control of the touch sensor panel is performed so that the X electrode transitions to a non-detection period (VHSP charge period) in line with the timing, focusing on the timing of the change in voltage of gate and drain electrodes of the LC display. In the control of the LC display, the setting is made so that the timing of down falling of the drive pulse supplied to the Y electrode precedes, by a fixed length of time, the timing of down falling of the gate pulse at which the tone voltage is decided, focusing on the timing of the change in voltage of the Y electrode of the touch sensor panel.

According to the relation between the timing associated with the drive pulse and the timing associated with the gate pulse, a high-level period of the drive pulse waveform (first pulse waveform) supplied to each Y electrode Y1-YM falls within a high-level period of the drive pulse waveform (second pulse waveform) supplied to each gate electrode G1-G640. Therefore, the width of the high level period of the first pulse waveform is smaller than the width of the high level period of the second pulse waveform. With this arrangement, focusing on the timing of the change in voltage of each scan electrode G1-G640 of the display panel 2, it is found that in control by the touch sensor panel controller 3, each Y electrode Y1-YM is put in a non-pulse drive period, during which the X electrode X1-XN is in a non-detection period (charge period), in line with the timing. Therefore, the noise generated by the change in voltage of the scan electrode G1-G640 has no influence on the detecting operation on the X electrode X1-XN, which is executed in a pulse drive period of the Y electrode Y1-YM. Further, focusing on the timing of the change in voltage of each Y electrode Y1-YM of the touch sensor panel, it is found that in control by the display driver 4, the timing of down falling of the drive pulse (first pulse waveform) for the Y electrode Y1-YM is not coincident with the timing of down falling (Ta in FIG. 18) of the drive pulse (second pulse waveform) for the scan electrode, at which a signal voltage supplied to a display cell is fixed. Therefore, the noise generated by the change in voltage of the Y electrode Y1-YM has no influence on the signal voltage fixed on the display cell. In short, the impairment of the ability of detecting a touch in the case of using the touch sensor panel controller 3, and the degradation of the performance of display by the display driver 4 can be avoided.

In the example shown in FIG. 18, the drive pulse is applied to the Y electrode once in each scan period of the LC display 2. In this case, a high-level period of the drive pulse of the Y electrode is set to be included in a high-level period of the gate pulse. The timing of the drive pulse for the Y electrode in this case can be easily by a reference clock (e.g. 4 MHz) from a built-in clock, a signal (e.g. a horizontal synchronizing signal such as Hsync) defining one scan period, and parameters t1, t2 and t3 exemplified in FIG. 18. The sequential control circuit 308 of the touch sensor panel controller 3 and 3A can control the pulse drive timing for the Y electrodes as exemplified in FIG. 18 by receiving the reference clock (e.g. 4 MHz), the horizontal synchronizing signal such as Hsync, and the parameters t1, t2 and t3. The parameters t1, t2 and t3 may be initially set on the control register 320 by the subsystem microprocessor 5.

FIG. 19 exemplifies values set in registers Twait, Tydrv and Tset for setting the parameters t1, t2 and t3, and set times corresponding to the set values. The registers Twait, Tydrv and Tset are composed of part of the control register 320.

All the arrangements described concerning the first embodiment can be applied to the second embodiment, which are not particularly shown in the drawing. In such case, as described with reference to FIG. 18 taking examples in the description on the first embodiment, a signal route and the like may be provided to enable the sequential control circuit to obtain parameters, a horizontal synchronizing signal, etc. for controlling a pulse drive waveform for the Y electrodes according to a drive waveform for the gate electrode.

(Third Embodiment)

The arrangement for optimizing the timing of the voltage step-up operation by the step-up circuit for the detecting operation by the touch sensor panel will be described in regard to the third embodiment.

Figure 20:
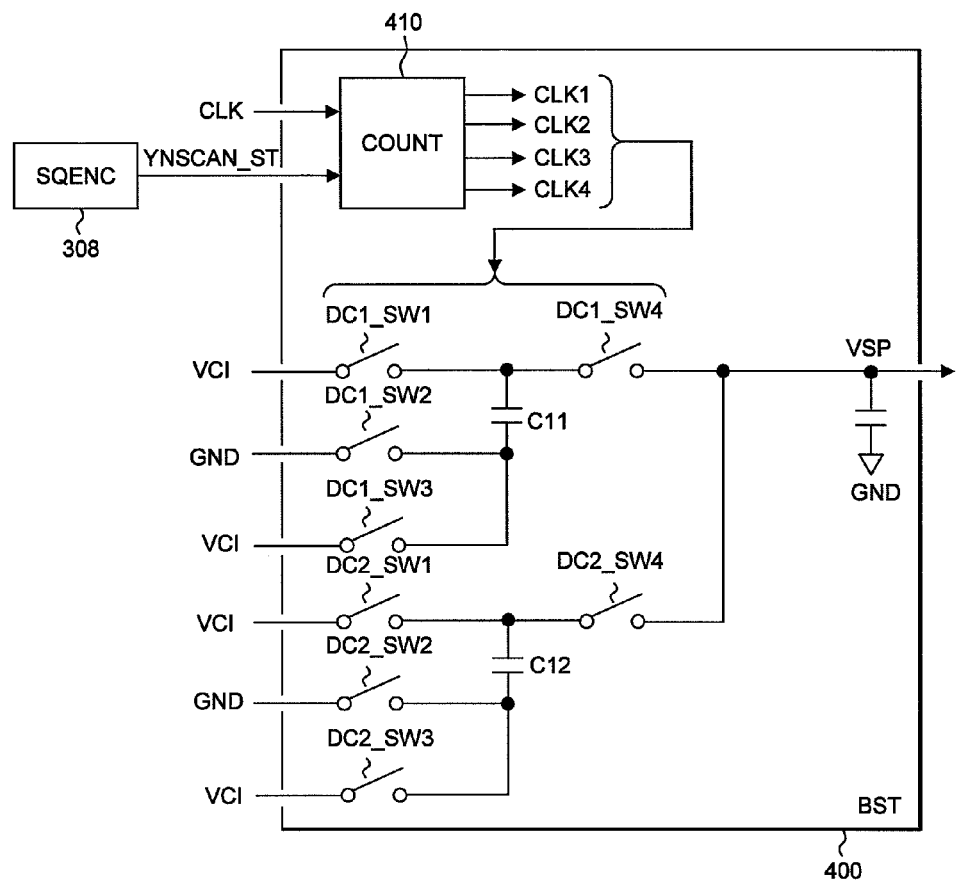
FIG. 20 is a circuit diagram showing an example of the step-up circuit.

FIG. 20 shows a charge pump circuit as an example of the step-up circuit 400. The charge pump circuit 400 includes: a counter 410 which counts a reference clock CLK of 4 MHz to output charge clock signals CCK1, CCK2, CCK3 and CCK4 of more than one phase based on outputs of required digits, for example; switch elements DC1_SW1 to DC1_SW4 and DC2_SW1 to DC2_SW4 controlled in switching by the charge clock signals CCK1 to CCK4 output from the counter 410; and capacitive elements C11 and C12, across which the movement of electric charges are caused in synchronization with the switching operations by the switch elements DC1_SW1 to DC1_SW4 and DC2_SW1 to DC2_SW4. The counter 410 is initialized into a count value zero (0) by a timing pulse YNSCAN_ST. The timing control circuit 308 of the touch sensor panel controller 3 produces the timing pulse YNSCAN_ST and supplies it to counter 410.

Figure 21:
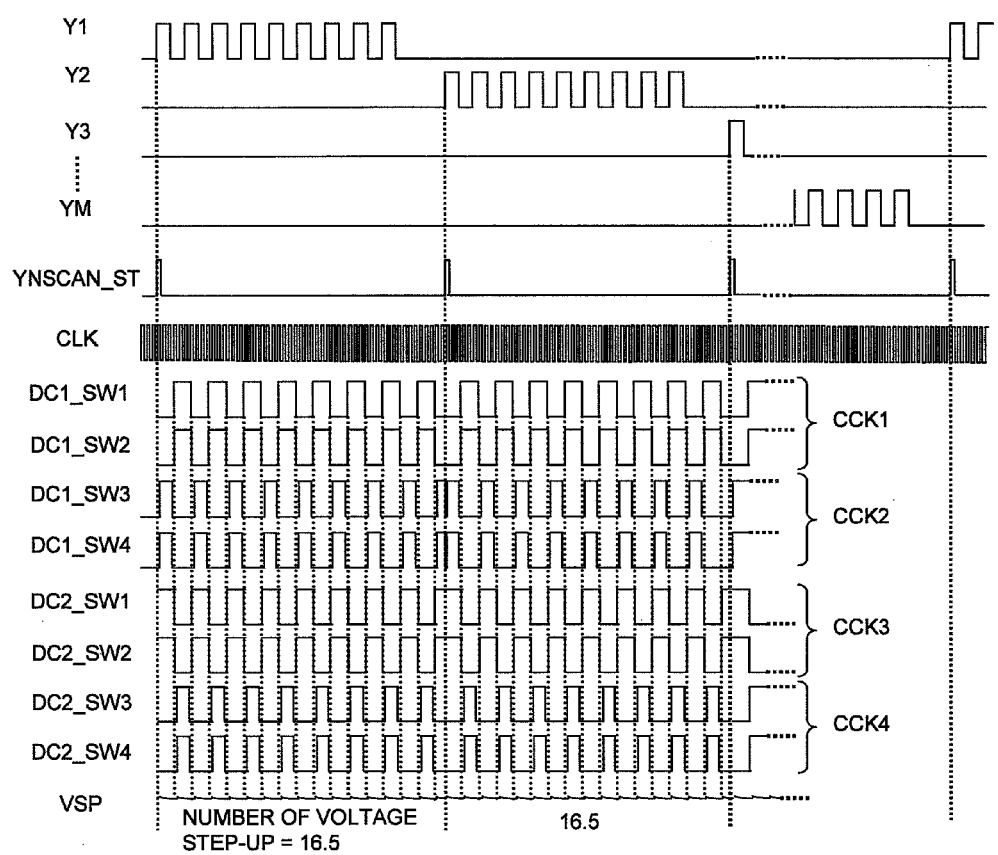
FIG. 21 is a timing chart exemplifying the timing of the operation for detection by the touch sensor panel controller, and the timing of the operation for voltage step-up by the step-up circuit.

FIG. 21 exemplifies the timing of the detecting operation by the touch sensor panel controller 3, and the timing of the voltage step-up operation by the step-up circuit. The timing signal YNSCAN_ST is changed into a pulse in synchronization with the heads of drive pulse waveforms for each Y electrode. In other words, the touch panel sensor controller 3 produces the timing signal YNSCAN_ST which indicates the head of a drive pulse to be applied to each Y electrode Y1-YM of the touch sensor panel. The step-up circuit 400 performs the voltage step-up operation in synchronization with the changes of charge clock signals CCK1, CCK2, CCK3 and CCK4 according to a count value resulting from the counting of the reference clock CLK of 4 MHz by the counter 410. The count value of the counter 410 is initialized into zero (0) each time the timing signal YNSCAN_ST is turn to its high level. As a result, inside states of the step-up circuit 400 are made uniform each time the timing signal YNSCAN_ST indicating the start of the operation of touch detection transitions to the high level, whereby the number of fluctuations (i.e. the number of voltage step-ups) of the power source voltage involved in the voltage step-up operation can be made the same for any drive period of Y electrodes Y1-YM. In the example shown in FIG. 21, the number of voltage step-ups in a detection period of each Y electrode Ym (m=1–M) is set to 16.5. As a result, the amount of superposition of noise produced by the voltage step-up operation by the step-up circuit is uniformized among the detection periods of the Y electrodes, and thus a high S/N ratio in the touch sensor panel 1 can be achieved.

With the third embodiment, the voltage step-up operation timing of the step-up circuit 400 has been described based on the relation with the detection operation cycle of the touch sensor panel 1. However, as described concerning the second embodiment, the operations of the LC display panel 2, the touch sensor panel 1 and the step-up circuit 400 can be synchronized each other by synchronizing the drive control of the LC display panel 2 with the detecting operation of the touch sensor panel 1, which is beneficial for achieving both of a high S/N ratio of the detecting operation in the touch sensor panel 1 and the avoidance of the deterioration of the display quality of the LC display panel 2.

The arrangement of the step-up circuit can be applied to other step-up circuits 309 and 700. The initialization of the counter 410 may be performed in synchronization with the timing signal indicating the end of the detecting operation for each Y electrode. Further, the initialization may be conducted with any timing as long as the timing of the initialization is unchanged in units of the cycle of driving the Y electrode by use of pulse waveforms.

While the invention made by the inventor has been concretely described based on the embodiments above, the invention is not limited to the embodiment. It is obvious that various changes and modifications thereof may be made without departing from the subject matter of the invention.

For instance, the embodiments can be materialized in combination with each other. The touch sensor panels, which the invention can be applied, include compact-size touch sensor panels having sizes as large as 5 to 7 inches, and large-size ones having a size of about 15 inches. The invention can be materialized as an LC driver with a touch sensor panel controller incorporated therein, and a touch sensor panel controller with an LC driver incorporated therein. A semiconductor device according to the invention may be in the form of a single chip or multichip. In the case of the semiconductor device in a multichip form, it may be realized as a module device such as a System-in-a-Package (SiP).

In the case of the semiconductor device in a single chip form, it may include not only the touch sensor panel controller and the LC driver, but also the subsystem microprocessor 5; in the case of the semiconductor device in a multichip form, the device may include two chips, i.e. a chip including the touch sensor panel controller 3 and the subsystem microprocessor 5, and a chip including the LC driver.

Further, while the invention has been described taking an integration circuit as an example of the detection circuit, the invention can be applied to any detection circuit as long as a detection method such that a pulse is input to the Y electrodes is adopted.

What is claimed is:

1. A touch sensor panel controller for a touch sensor panel having Y electrodes, X electrodes, and a capacitance formed at each of intersections of the X and Y electrodes, the controller comprising:
   a drive circuit which drives the Y electrodes of the touch sensor panel;
   a detection circuit which accepts input of signals from the X electrodes, and detects a capacitance value of the capacitance at each intersection; and a control part which controls the drive circuit and the detection circuit, wherein the drive circuit applies a pulse of AC drive voltage to the Y electrodes, a low level of said pulse having a negative voltage and a high level of said pulse having a positive voltage, wherein the control part selects a value for the negative voltage of the low level from among a plurality of predetermined voltage levels based on select data supplied from outside.

2. A semiconductor device comprising:

a touch sensor panel controller for a touch sensor panel having Y electrodes, X electrodes, and a capacitance formed at each of intersections of the X and Y electrodes, which drives the Y electrodes of the touch sensor panel, accepts input of signals from the X electrodes, and detects capacitance values of the capacitances at the intersections, and which has a drive circuit operable to apply a pulse of AC drive voltage to the Y electrodes, a low level of said pulse having a negative voltage and a high level of said pulse having a positive voltage; and a display driver which supplies a display drive voltage to an active matrix type display panel having display cells at points where scan and signal electrodes intersect each other, wherein the display driver has a step-up circuit operable to produce voltages used for driving the scan and signal electrodes, wherein the drive circuit uses a voltage produced by the step-up circuit for both or one of the high and low level voltages of the AC drive voltage, wherein the step-up circuit performs a charge pump operation in synchronization with pulse changes of charge clock signals of more than one phase, and wherein the charge clock signals of more than one phase are initialized in units of cycles of driving by more than one pulse waveform for each Y electrode.

3. A semiconductor device comprising:

a touch sensor panel controller for a touch sensor panel having Y electrodes, X electrodes, and a capacitance formed at each of intersections of the X and Y electrodes, which drives the Y electrodes of the touch sensor panel, accepts input of signals from the X electrodes, and detects capacitance values of the capacitances at the intersections, and which has a drive circuit operable to apply a pulse of AC drive voltage to the Y electrodes, a low level of said pulse having a negative voltage and a high level of said pulse having a positive voltage; and a display driver which supplies a display drive voltage to an active matrix type display panel having display cells at points where scan and signal electrodes intersect each other, wherein the touch sensor panel controller further includes a control part operable to select a value for the negative voltage of the low level from among a plurality of predetermined voltage levels based on select data provided from outside.

4. A semiconductor device comprising:

a touch sensor panel controller for a touch sensor panel having Y electrodes, X electrodes, and a capacitance formed at each of intersections of the X and Y electrodes, which drives the Y electrodes of the touch sensor panel, accepts input of signals from the X electrodes, and detects capacitance values of the capacitances at the intersections, and which has a drive circuit operable to apply a pulse of AC drive voltage to the Y electrodes, a low level of said pulse having a negative voltage and a high level of said pulse having a positive voltage; and a display driver which supplies a display drive voltage to an active matrix type display panel having display cells at points where scan and signal electrodes intersect each other, wherein the semiconductor device comprises a structure composed of one of a single chip having the touch sensor panel controller and the display driver formed on a common semiconductor substrate, and a multichip having the touch sensor panel controller and the display driver formed on separate semiconductor substrates.

5. A semiconductor device comprising:

a touch sensor panel controller for a touch sensor panel having Y electrodes, X electrodes, and a capacitance formed at each of intersections of the X and Y electrodes, which drives the Y electrodes of the touch sensor panel, accepts input of signals from the X electrodes, and detects a capacitance value of the capacitance at each intersection; and a display driver which supplies a display drive voltage to an active matrix type display panel having display cells at points where scan and signal electrodes intersect each other, wherein the touch sensor panel controller has a first drive circuit operable to apply first pulse waveforms to the Y electrodes, the display driver has a second drive circuit operable to apply second pulse waveforms to the scan electrodes of the active matrix type display panel, and the first and second drive circuits are configured to apply the first and second pulse waveforms such that a high level period of each first pulse waveform is within a high level period of a respective one of the second pulse waveforms, such that a time when each first pulse waveform rises is later than a time when the respective one of the second pulse waveforms rises, and such that a time when each first pulse waveform falls is before a time when the respective one of the second pulse waveform falls.

6. The semiconductor device according to claim 5, wherein the second drive circuit produces the second pulse waveforms based on a drive timing of the display panel, and the first drive circuit produces the first pulse waveforms based on the drive timing of the display panel, provided that the high level period of each first pulse waveform is set within the high level period of the respective one of the second pulse waveforms, and the width of the high level of each first pulse waveform is set to be smaller than the width of the high level of the respective one of the second pulse waveforms.

7. The semiconductor device according to claim 6, wherein the timing of change of each first pulse waveform is set by setting, on the first drive circuit, a wait time (t1) which is an elapse of time after the rising of the respective one of the second pulse waveforms, and a set time (t3) before the falling of the respective one of the second pulse waveforms.

8. A touch sensor panel controller for a touch sensor panel having Y electrodes, X electrodes, and a capacitance formed by the X and Y electrodes at each of intersections thereof, the controller comprising:

a drive circuit operable to drive the Y electrodes of the touch sensor panel;

a detection circuit operable to accept input of a signal from each X electrode and to detect a capacitance value of the capacitance at each intersection; and a step-up circuit operable to produce a power source voltage for operating the drive circuit and the detection circuit, wherein the drive circuit applies more than one pulse waveform to each Y electrode to activate the Y electrode, the step-up circuit performs a charge pump operation in synchronization with pulse changes of charge clock signals of more than one phase, and the charge clock signals of more than one phase are initialized in units of cycles of driving by more than one pulse waveform for each Y electrode.

9. The touch sensor panel controller according to claim 8, wherein the step-up circuit has a counter which counts clock signals and produces the charge clock signals of more than one phase based on outputs of required digits, and the counter has a count value initialized in units of cycles of driving by more than one pulse waveform for each Y electrode.

10. A semiconductor device comprising:

a touch sensor panel controller for a touch sensor panel having Y electrodes, X electrodes, and a capacitance formed by the X and Y electrodes at each of intersections thereof, the controller having a drive circuit operable to drive the Y electrodes of the touch sensor panel, and a detection circuit operable to accept input of a signal from each X electrode and to detect a capacitance value of the capacitance at each intersection;

a display driver operable to supply a display drive voltage to an active matrix type display panel having scan electrodes, signal electrodes, and display cells located at points where the scan electrodes and signal electrodes intersect each other; and a step-up circuit, wherein the drive circuit applies more than one pulse waveform to each Y electrode to drive the Y electrode, the step-up circuit produces power source voltages to operate the drive circuit, the detection circuit and the display driver, and performs a charge pump operation in synchronization with pulse changes of charge clock signals of more than one phase, and the charge clock signals of more than one phase are initialized in units of cycles of driving by more than one pulse waveform for each Y electrode.

11. The semiconductor device according to claim 10, wherein the step-up circuit has a counter which counts clock signals and produces the charge clock signals of more than one phase based on outputs of required digits, and the counter has a count value initialized in units of cycles of driving by more than one pulse waveform for each Y electrode.

12. The semiconductor device according to claim 5, wherein the touch sensor panel controller has a detection circuit that accepts the input of signals from the X electrodes, and detects the capacitance value of the capacitance at each intersection.

* * * * *